United States Patent
Keskar

(10) Patent No.: US 10,642,825 B2
(45) Date of Patent: *May 5, 2020

(54) SYSTEM AND METHOD FOR INTEROPERABILITY OF BLOCKCHAINS

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,217

(22) Filed: Jun. 28, 2019

(65) Prior Publication Data
US 2019/0317936 A1    Oct. 17, 2019

Related U.S. Application Data

(63) Continuation of application No. 16/229,059, filed on Dec. 21, 2018.

(60) Provisional application No. 62/758,113, filed on Nov. 9, 2018.

(51) Int. Cl.
| | |
|---|---|
| *G06F 7/00* | (2006.01) |
| *G06F 17/30* | (2006.01) |
| *G06F 16/23* | (2019.01) |
| *H04L 9/06* | (2006.01) |
| *G06F 16/182* | (2019.01) |
| *H04L 29/06* | (2006.01) |
| *H04L 9/08* | (2006.01) |

(52) U.S. Cl.
CPC ........ *G06F 16/2379* (2019.01); *G06F 16/183* (2019.01); *H04L 9/0637* (2013.01); *H04L 9/0643* (2013.01); *H04L 9/0891* (2013.01); *H04L 9/0894* (2013.01); *H04L 63/0442* (2013.01); *H04L 2209/38* (2013.01)

(58) Field of Classification Search
CPC . G06F 16/2379; G06F 16/183; H04L 9/0637; H04L 9/0643; H04L 9/0891; H04L 9/0894; H04L 63/0442; H04L 2209/38
USPC .......................................... 707/703
See application file for complete search history.

(56) References Cited

U.S. PATENT DOCUMENTS

| | | | |
|---|---|---|---|
| 10,095,888 B1* | 10/2018 | Lee .................. | G06F 21/64 |
| 2011/0224811 A1* | 9/2011 | Lauwers ............ | G06F 3/16 |
| | | | 700/94 |
| 2016/0292672 A1* | 10/2016 | Fay .................. | G06Q 20/363 |
| 2017/0011460 A1* | 1/2017 | Molinari ........... | G06Q 40/04 |
| 2017/0046651 A1* | 2/2017 | Lin .................. | G06Q 20/065 |
| 2017/0134161 A1* | 5/2017 | Goeringer ......... | H04L 9/3236 |
| 2017/0177855 A1* | 6/2017 | Costa Faidella .... | H04L 63/08 |

(Continued)

*Primary Examiner* — Binh V Ho

(74) *Attorney, Agent, or Firm* — Innovation Capital Law Group, LLP; Vic Lin

(57) ABSTRACT

Disclosed herein is a system and method for interoperability of blockchains thereby allowing use of smart contracts across blockchains in real time and in a secured manner. A plurality of blockchains are connected to each other and allow use of smart contracts written on them by other connected blockchains without the need of rewriting and/or downloading the smart contract on other blockchain. The disclosed system and methods use a distributed file system storage for secured processing of information flowing from one blockchain to other connected blockchain. Further, each connected blockchain is associated with distinct private and public key in order to encrypt and decrypt the data flowing across blockchains.

9 Claims, 12 Drawing Sheets

(56) References Cited

U.S. PATENT DOCUMENTS

| | | | |
|---|---|---|---|
| 2017/0177898 A1* | 6/2017 | Dillenberger | G06F 16/2379 |
| 2017/0212781 A1* | 7/2017 | Dillenberger | G06F 9/5038 |
| 2017/0213209 A1* | 7/2017 | Dillenberger | G06Q 20/3829 |
| 2017/0230189 A1* | 8/2017 | Toll | H04L 9/3247 |
| 2017/0236196 A1* | 8/2017 | Isaacson | G06Q 30/0625 |
| | | | 705/14.51 |
| 2017/0300876 A1* | 10/2017 | Musiala, Jr. | G06Q 20/0655 |
| 2017/0344435 A1* | 11/2017 | Davis | G06F 11/1464 |
| 2018/0012311 A1* | 1/2018 | Small | B33Y 50/02 |
| 2018/0114205 A1* | 4/2018 | Thomas | G06Q 40/02 |
| 2018/0183587 A1* | 6/2018 | Won | G06F 21/44 |
| 2019/0080392 A1* | 3/2019 | Youb | H04L 9/0643 |
| 2019/0188411 A1* | 6/2019 | Kroutik | G06F 21/6245 |
| 2019/0228453 A1* | 7/2019 | Chapman | G06N 20/00 |

* cited by examiner

208

| Index No. | Method name | Smart Contract Method | Function Description | Smart Contract Name | Blockchain Name |
|---|---|---|---|---|---|
| 1 | sign | createsign () | Create signature using private key | @Transfer | B1 |
| 2 | getpct (302) | getpct() (304) | Calculate percentage of two integers. Inputs two float integer (306) | @Maths (308) | B2 (310) |
| 3 | classify.documents | classify.documents () | Classify documents into patents/NPL | @Classifier | B2 |

| S. No. | Transaction | Smart Contract Method | Smart Contract | Execution Status | Blockchain Name | Returned hash From IPFS | Output |
|---|---|---|---|---|---|---|---|
| 1 | Txn0 | getpct() | @Math | Pending | B2 | False | False |
| 2 | Txn1 402 | log() 404 | @Advanced Maths 406 | Pending 408 | B2 410 | False 412 | False 412 |

| S. No. | Transaction | Smart Contract Method | Smart Contract | Execution Status | Blockchain Name | Returned hash From IPFS | Output |
|---|---|---|---|---|---|---|---|
| 1 | Txn0 | getpct() | @Math | Pending | B2 | QmafamHDpSXGKUNxVS reRXj9xe9pdxwbb8B15 ZdepNgV4XU 412 | False |
| 2 | Txn1 | log() | @Advanced Math | Pending | B2 | False | False |

620 → *Name : classify.documents()*

*Param1:False; Param2:False; Param3:US; Param4:False*

| S. No. | Transaction | Smart Contract Method | Smart Contract | Execution Status | Blockchain Name | Returned hash From IPFS | Output |
|---|---|---|---|---|---|---|---|
| 1 | Txn9 | classify.documents () | @Classifier | Pending | B2 | Qm7fCsjgo2w7wqmDJs8Lu1pCNeCrCDuE4GAwkna83zds7d | False |

| Index No. | Name Identifier | Smart Contract Method | Function Description | Smart Contract Name | Blockchain Name |
|---|---|---|---|---|---|
| 1 | sign | createsign () | Create signature using private key | @Transfer | B1 |
| 2 | getpct | getpct() | Calculate percentage of two integers | @Maths | B2 |
| 3 | classify.documents | classify.documents () | Classify documents into patents/NPL | @Classifier | B2 |

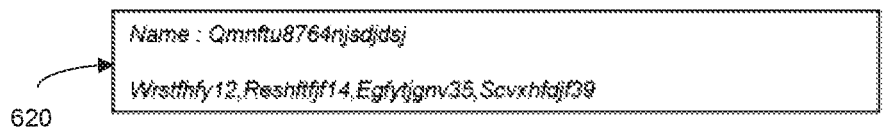

| S. No. | Transaction | Smart Contract Method | Smart Contract | Execution Status | Blockchain Name | Returned hash From IPFS | Output |
|---|---|---|---|---|---|---|---|
| 1 | Txn0 | classify.documents () | @Classifier | Pending | B2 | QmiUejgo2gTwqnMJs8LufpVNedrCDuE4GAwkna93zde6a | |

| Index No. | Name Identifier | Smart Contract Method | Function Description | Smart Contract Name | Blockchain Name |
|---|---|---|---|---|---|
| 1 | sign | createsign () | Create signature using private key | @Transfer | B1 |
| 2 | getpct | getpct() | Calculate percentage of two integers | @Maths | B2 |
| 3 | classify.documents | classify.documents () | Classify documents into patents/NPL | @Classifier | B2 |

SYSTEM AND METHOD FOR INTEROPERABILITY OF BLOCKCHAINS

CROSS-REFERENCE TO RELATED APPLICATIONS

This application is a continuation application of prior U.S. non-provisional patent application Ser. No. 16/229,059, titled "SYSTEM AND METHOD FOR INTEROPERABILITY OF BLOCKCHAINS" and filed on Dec. 21, 2018, which is incorporated herein by reference. The said non-provisional application is based upon a provisional patent application No. US 62/758,113 as filed on Nov. 9, 2018, which is herein incorporated by reference in its entirety.

TECHNICAL FIELD

The present application relates generally to the field of data processing on distributed ledger platforms and particularly to interoperability of blockchains. Moreover, the present invention relates to reusability of smart contracts across one or more blockchain platforms.

BACKGROUND

In recent times, use of blockchain technology has expanded beyond crypto currency, to provide a framework for the execution of smart contracts. Smart contracts are self-executing agreements between parties that have all the terms & conditions written in code, and execute automatically, depending on future signatures or trigger events. By leveraging blockchain technologies, smart contracts, once appended to the blockchain, cannot be revoked, denied, or reversed. A smart contract usually provides multiple functions which can be executed by simply invoking a call method on the blockchain to which the said smart contract is appended to. As more and more blockchains with varied processing and execution speed continue to emerge, multiple smart contracts with various functionalities are being written. However, usage of smart contract functionality is limited to the blockchain hosting the said smart contract. A user associated with one blockchain is unable to use functionalities of a smart contract on another blockchain, due to different structure and language of smart contracts prevalent across different blockchains. Further, some of the blockchains have higher execution speed resulting in faster execution of algorithms embedded inside a smart contract appended thereto and such algorithms/methods are not accessible to a user on a different blockchain. This limits the benefits arising out of smart contracts and hinders interoperability of blockchains.

One of the commonly used methods for executing a smart contract method, from another blockchain, on a subject blockchain is to copy the said smart contract code onto a third part processing platform, rewrite the code in a language and structure acceptable to subject blockchain and add the same to the subject blockchain. Optionally, users may register on the other blockchain and use the smart contract functionality directly on the other blockchain.

The abovementioned method of reusing smart contract from other blockchain results in unnecessary wastage of resources, time and manpower in rewriting the whole smart contract. Further, different blockchains have different functionality support, algorithms and execution speed and hence smart contracts codes, from other blockchains, cannot be rewritten and/or copied onto them. Moreover, such rewriting of smart contract codes doesn't allow real time execution of smart contracts.

In light of the above-mentioned shortcomings associated with existing methods and systems for reusing smart contracts across blockchains in near real-time, it is highly desirable to have a system and method that allows real-time reusability of smart contracts across blockchains. The present invention, as described below, allows interoperability amongst blockchains by enabling use of smart contracts across different blockchains without the need of rewriting the smart contract codes from one blockchain to another blockchain.

SUMMARY

Embodiments of the present disclosure present technological improvements as solutions to one or more of the above-mentioned technical problems recognized by the inventor in conventional systems.

In an aspect of the present invention, a system and method for interoperability of blockchains connected to one another in a networked environment is provided.

In another aspect, a system and method for reusing smart contract across blockchains in real time is provided by leveraging a distributed file storage system and deferred execution of transactions on a blockchain, thereby enabling use of a smart contract method on a blockchain by other blockchains.

In yet another aspect, the present invention provides system and methods for enabling use of smart contracts across blockchains in a secured manner by encrypting the communication between the blockchain and distributed file storage system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the below-mentioned detailed description and drawings.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 3 depicts a method index for identifying a non-host blockchain as per the present disclosure.

FIG. 4 depicts a detailed view of the list maintained inside an initial smart contract on a blockchain as per the present disclosure.

FIG. 4A depicts a detailed view of the list, in a modified state, maintained inside an initial smart contract on a blockchain as per the present disclosure

FIG. 7A depicts the contents of storage location in the distributed file system storage.

FIG. 7B depicts an entry in the list maintained in the initial smart contract of the host blockchain, after the non-host blockchain is identified.

FIG. 7C depicts an entry in the method index.

FIG. 10A depicts the contents of storage location in the distributed file system storage, in the alternate embodiment of the present disclosure.

FIG. 10B depicts an entry in the list maintained in the initial smart contract of the host blockchain, after the non-host blockchain is identified, as per the alternate embodiment of the present disclosure.

FIG. 10C depicts an entry in the method index, as per the alternate embodiment of the present disclosure.

Figure 1:
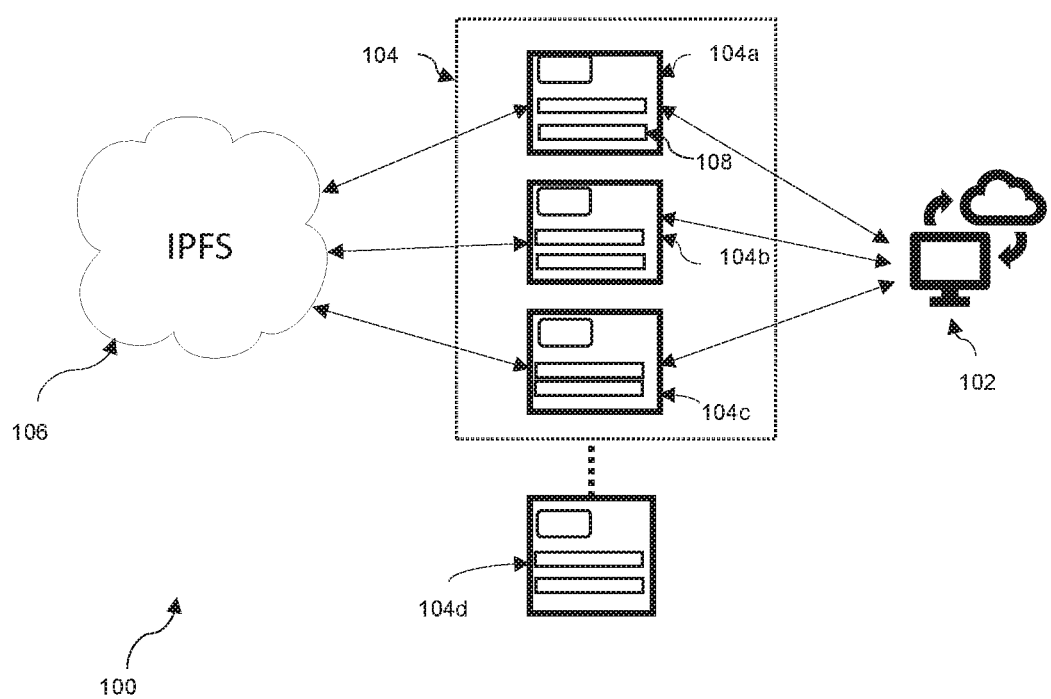
FIG. 1 is a schematic illustration of FIG. 1 depicts a system for reusing of smart contracts across blockchains, according to an exemplary embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the nonunderlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. The person skilled in the art will recognize many variations, alternatives, and modifications of embodiments of the present disclosure. It should be understood that this invention is not limited to the particular methodology, protocols, and the like, described herein and as such may vary. The terminology used herein is for the purpose of describing particular embodiments only and is not intended to limit the scope of the present invention, which is defined solely by the claims.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments of the aspects described herein, and are not intended to limit the claimed invention, because the scope of the invention is limited only by the claims. Further, unless otherwise required by context, singular terms shall include pluralities and plural terms shall include the singular.

As used herein the term "comprising" or "comprises" is used in reference to compositions, methods, and respective component(s) thereof, that are essential to the invention, yet open to the inclusion of unspecified elements, whether essential or not.

The singular terms "a," "an," and "the" include plural referents unless context clearly indicates otherwise. Similarly, the word "or" is intended to include "and" unless the context clearly indicates otherwise. Thus, for example, references to "the method" includes one or more methods, and/or steps of the type described herein, and/or which will become apparent to those persons skilled in the art upon reading this disclosure and so forth.

Although methods and materials similar or equivalent to those described herein can be used in the practice or testing of this disclosure, suitable methods and materials are described below. The term "comprises" means "includes." The abbreviation, "e.g." is derived from the Latin exempli gratia and is used herein to indicate a non-limiting example. Thus, the abbreviation "e.g." is synonymous with the term "for example."

The present invention claims a system and method for reusability of smart contract methods across blockchains, thereby allowing inter-operability amongst blockchains. FIG. 1 depicts an exemplary embodiment of a system for reusing of smart contracts methods across blockchains. As per the exemplary embodiment of FIG. 1, the system 100 comprises a server arrangement 102 communicably coupled to a plurality of blockchains 104 comprising a host blockchain 104a and a non-host blockchain 104b. Each of the plurality of the blockchains are communicably coupled to a distributed file system storage 106. The distributed file system shown in FIG. 1 is Inter planetary File System (IPFS) as per the exemplary embodiment described herein. However, it shall be appreciated that any distributed file system storage would perform in similar manner as IPFS for the purposes of present invention. The term "host blockchain" refers to a blockchain, amongst the plurality of blockchain, to which a first transaction requesting an execution of a smart contract method is added. Further, the term "non-host blockchain" refers to a blockchain, amongst the plurality of blockchains, with said smart contract method deployed. Furthermore, 104d depicts a new incoming blockchain to the plurality of blockchains. The server arrangement 102 is operable to add a transaction 108 to any of the plurality of blockchain platforms 104. The transaction 108 may be added through a web-based application or mobile based application on a frontend unit 108 (not shown in FIG. 1) of the server arrangement 102. In an alternate embodiment, third party extensions on the server arrangement allowing addition of the transaction to the blockchain are used.

Furthermore, each of the plurality of blockchains is configured to defer, for a predetermined period, an execution of the transaction added to it. The transaction is executed after the predetermined period and the server arrangement is operable to receive, through the frontend unit, an output for the executed transaction. Each of the plurality of blockchains are deployed with one or more smart contracts, the one or more smart contracts comprising multiple smart contract methods, each smart contract method pertaining to a defined output. An example of said smart contract method could be getPastEvents( ) which can be used to query the event logs since the beginning of time. Similarly, there can be various smart contract methods programmed on the one or more smart contracts of each of the plurality of blockchains.

In an aspect of the present invention, each of the plurality of blockchains are distinct from one another in terms of architecture, configuration, execution speed and a functionality of one of more smart contracts deployed upon them. An example of said distinct blockchains are Ethereum, EOS, Multichain, Stellar, Corda etc. It shall be appreciated that multiple other blockchains may form part of the plurality of blockchains of said system.

Throughout this disclosure the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device.

The server arrangement is communicably coupled via one or more communication networks to the plurality of blockchains. The term "one or more communication networks" can be a collection of individual networks, interconnected with each other and functioning as a single large network. Such individual networks may be wired, wireless, or a combination thereof.

Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Moreover, the term "frontend unit" refers to a graphical user interface unit or a command line interface which enables a user to access information stored on the blockchain and/or to store information on the blockchain.

In the following paragraphs, structure of at least one of the plurality of blockchains, communicably coupled to the server arrangement, is described. Although the description is provided with respect to one blockchain, it shall be appreciated by persons skilled in the art that each of the plurality of blockchains, communicably coupled to the server arrangement, is configured in a similar manner. Moreover, any new incoming blockchain into the system must be configured in a similar manner, as described below, to achieve interoperability, as disclosed by the present invention, amongst the plurality of blockchains.

Figure 2:
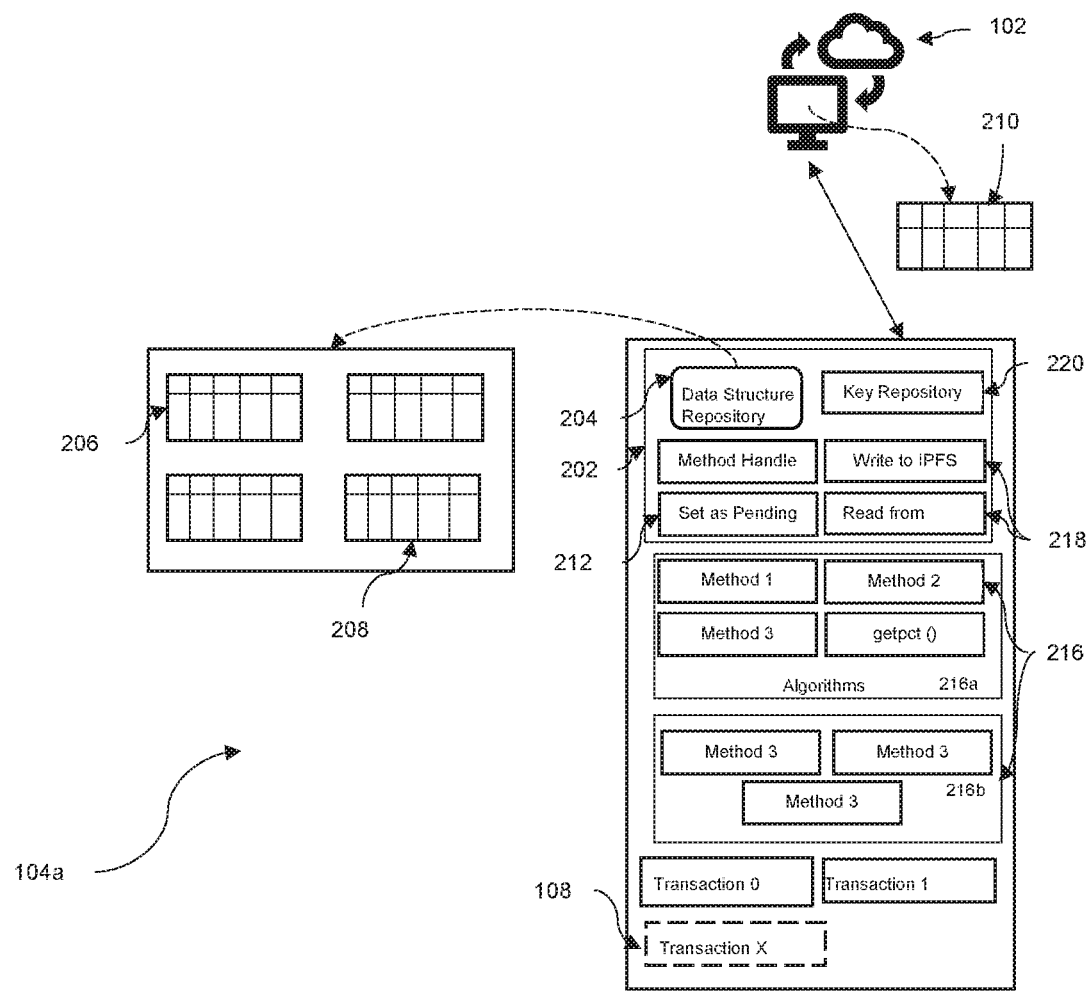
FIG. 2 depicts a detailed architectural block diagram for a blockchain configured as per the present disclosure.

FIG. 2 depicts a detailed architectural block diagram for one of the plurality of blockchains, 104a, hereinafter referred to as exemplary blockchain for the purpose of describing FIG. 2, configured as per the present invention. Each of the plurality of blockchains has a similar architecture and is configured in a similar manner as the exemplary blockchain. The exemplary blockchain comprises one or more smart contracts 214, and an initial smart contract 202 wherein the initial smart contract 202 includes at least one data structure repository 204. The one or more smart contracts 214 further comprises one or more smart contract methods 216. The initial smart contract 202 is operable to store, in the data structure repository 204, a list 206 of one or more transactions added to the exemplary blockchain wherein each of the one or more transactions are mapped against a method name, an execution status, and a returned hash from IPFS pertaining to each of the one or more transactions. The term "smart contract method" refers to set of codes which are used to interrogate a smart contract or change its state. A smart contract can have more than one smart contract methods within it, based on the desired output. As a non-limiting example, as used in the accompanying drawings and flowcharts for the present invention, getpct( ) is a smart contract method for calculating percentages, given two integers as input parameters. In the above example, getpct is a method name for the smart contract method getpct ( ).

Further, the initial smart contract 202 is operable to store, in the data structure repository 204, a method index 208 wherein the method index comprises an index of one or more method names, each of the one or more method names mapped against a smart contract method, a smart contract name and a blockchain name. Throughout the present disclosure, a method name, a smart contract name, and a blockchain name is an alias used to refer a smart contract method, a smart contract and a blockchain respectively. The alias could be any set of characters, numerical, alphanumeric codes, Hex codes or any nomenclature system capable of referring to and identifying a distinct entity. In an embodiment, the smart contract name may directly refer to the smart contract on a blockchain like in EOS blockchain. Optionally, alternatively, the smart contract name can be used to refer to an address of the smart contract on the blockchain, as in Ethereum blockchain.

The method index 208 allows identification of a non-host blockchain deployed with a smart contract comprising a smart contract method, as received in the transaction appended to the host blockchain. It shall be appreciated by person skilled in the art that the initial smart contract 202 may deploy any of the prevalent indexing mechanisms including, but not limited to, invented indexing. Preferably, the method index 208 stored in the data structure repository 204 of the initial smart contract 202 of each of the plurality of blockchain is updated regularly and synchronised with all other blockchains of the plurality of blockchains.

Optionally, the sever arrangement 202 maintains a master method index 210 (not shown in FIG. 2). The master method index 210 is a replica copy of the method index 208. Any new incoming blockchain 104d (as shown in FIG. 1) in to the system 100 interacts with the server arrangement 102 to provide, through its Application Binary Interface (ABI), a list of deployed smart contracts, accesible smart contracts methods and their associated parameters. These details along with the contract address are crucial for interacting with one or more smart contract methods on the new incoming blockchain. Optionally, a new smart contract with new set of smart contract methods may be added to an existing blockchain amongst the plurality of blockchains. Consequently, the server arrangement 102 updates the master method index 210 and broadcasts the updated master method index to each of the plurality of blockchains 104. The initial smart contract 202 of each of the plurality of blockchains updates, based on the updated master method index, the method index 208 stored in its data structure repository 204.

In an embodiment, the method index 208 is stored directly on the server arrangement 102. Each of the plurality of blockchains communicates with the server arrangement 102 in order to identify a non-host blockchain deployed with a desired smart contract method. The method index is kept updated, by the server arrangement 102, in case of any new incoming blockchain Optionally, alternatively, said method index 208 is stored in an off-chain storage medium, external to the blockchain, verified by the blockchain wherein the method index 208 can be efficiently fetched, on the fly, by each of the plurality of blockchains.

Optionally, the initial smart contract 202 is configured to include a validation indicator 212 wherein the validation indicator 212 indicates an execution status of the transaction added to the blockchain. In an embodiment, the validation indicator 212 is implemented by means of a flag which is set in case of a successful execution of the transaction. In case of deferred execution, the flag is reset until the transaction is executed. The validation indicator is used by the initial smart contract 202 to update the execution status of the transaction in the list 206 maintained in the data structure repository 204.

Furthermore, the initial smart contract 202 comprises of one or more standard method calls 218 with pre-configured permissions. The term "standard method call" refers to a default method call, from a smart contract, with pre-configured parameters unalterable by any user of blockchain. Optionally, the standard method calls can be implemented through one or more smart contract wrappers. An example of said standard method calls, as used in the preferred embodiment, is "Write to IPFS", "READ from IPFS". Each of the plurality of blockchains is configured for a communication with the distributed file system storage using the one or more standard method calls of the default system smart contract. The term "communication", as used herein, refers to reading from and writing to distributed file storage system. The distributed file system storage provides a protocol for storing and exchanging documents for peer-to-peer transfers. Furthermore, information may be stored at various peer pertaining to various public records of the distributed file system. The peer records are not dependent on each other; this ensures that the distributed file system has no failures due to non-functionality of any of the peer records. Once stored, content of information cannot be changed. This makes the distributed file system secure. In case of writing a data record on the distributed file storage system, an address hash is returned from said distributed file system, the address hash indicative of the storage location of the data record. The data record can be read on the distributed file storage system using the returned address hash. It shall be appreciated by the person skilled in the art that the standard method calls referred above are exemplary names with base functionality referring to writing to and reading from a distributed file system storage system.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for each of the plurality of blockchain communicably coupled to the server arrangement. Any new incoming blockchain into the system must be deployed the initial smart contract. Further, the term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

FIG. 3. depicts a method index 208 comprising an index of one or more method names wherein each of the one or more method names is mapped against a smart contract method, a smart contract name and a blockchain name. The method name is an alias for a smart contract method. The function description describes the functionality of the smart contract method. The smart contract name refers to the smart contract which hosts the smart contract method. The blockchain name refers to a blockchain on which the smart contract is deployed. In other words, the non-host blockchain is the one which has the smart contract method deployed. Referring to FIG. 3, an example entry of the method index 208 reads as follows: 302 is a method name for a smart contract method 304 within a smart contract 308 deployed on a blockchain 310. 306 describes a functionality for the smart contract method and type of input parameters. Consequently, it can be identified that getpct is the method name for a smart contract method getpct ( ) present in a smart contract @Maths on B2 blockchain. Further, as per 306, it is deduced that the smart contract method requires two integers as float type.

In an embodiment, a smart contract method with a defined functional output may be present on one or more blockchains. Such smart contract methods may be represented by distinct names across individual blockchains, although returning a same functional output. Further, one or more smart contract method with the same functional output but distinct names may be present across different smart contracts on individual blockchains. A grouping of said smart contract methods, with the same functional output, can be done based on the functional description field 306 of the method index 208. Beneficially, the method index 208 comprises a representative name identifier for the one or more distinct smart contract methods returning the same functional output.

Optionally, alternatively, a first smart contract method may return the same functional output as compared to a second smart contract method but may vary in terms of input parameters types. Furthermore, one or more smart contract method returning the same functional output may have varying execution speed and accuracy. Subsequently, the method index 208 comprises index fields for for type of input parameters, accuracy and execution speed of the smart contract method. In an embodiment, the method index 208 may provide recommendations for use of a smart contract method based on a desired output functionality. This is achieved by computing a suitability index for each of the method name. The suitability index is based on several parameters, including but not limited to, an execution speed of a smart contract on a blockchain deployed with the smart contract method, an accuracy of the smart contract method, amount of resources and energy requirements for processing the smart contract method.

In an embodiment of the present invention, a user may select, through the frontend unit, one or more of a plurality of functionalities available across the plurality of blockchains communicably coupled to the server arrangement. The server arrangement is configured to select the most suitable smart contract method for the selected functionality based on a computed suitability index. In another embodiment, the user may be provided with recommendations for one or more smart contract methods for the selected functionality.

Figure 11:
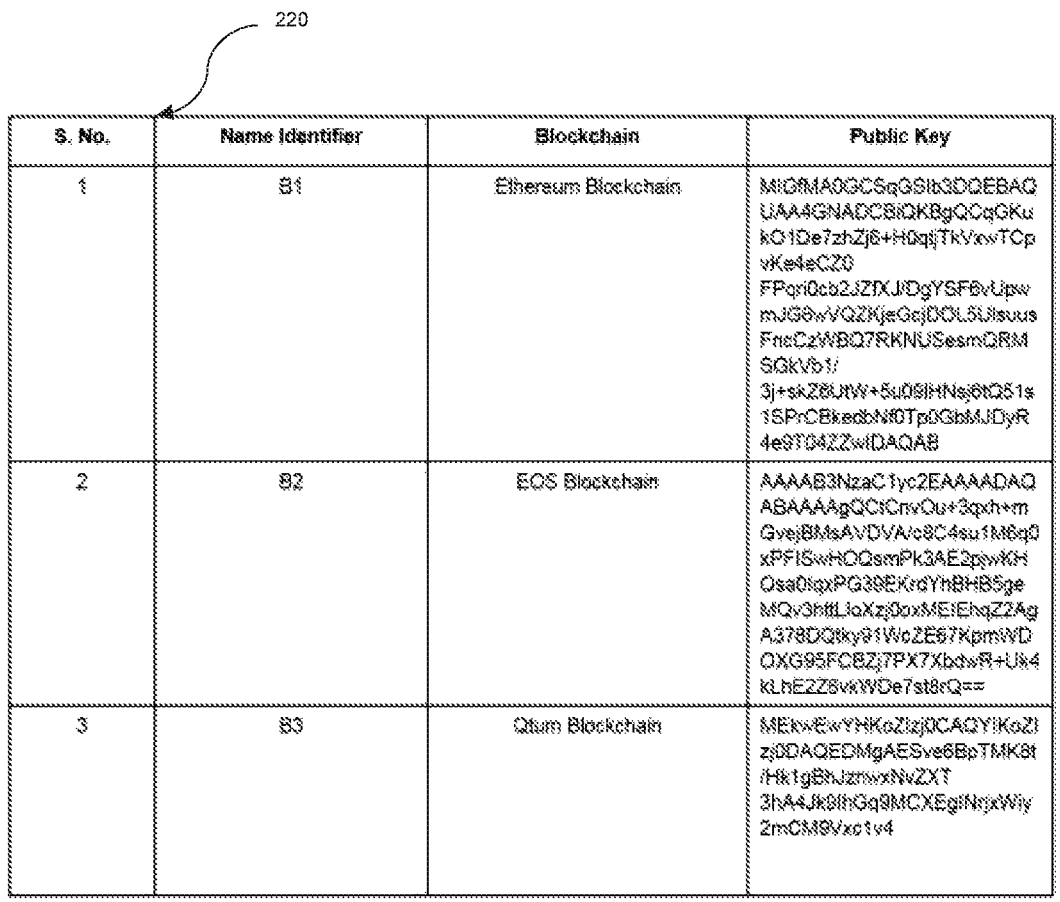
FIG. 11 depicts a detailed view of a key repository.

Further, the exemplary blockchain is associated with a private key and a public key. The exemplary blockchain is configured to store a key repository 220 within the initial smart contract 202 wherein the key repository 220 comprises a mapping of each of the plurality of blockchain and the public key associated with said blockchain. FIG. 11 depicts a detailed view of a key repository 220. The key repository 220 updates whenever a new incoming blockchain form part of the plurality of blockchains. The key repository 220 is exposed to any incoming smart contract or the initial smart contract through one of the standard method calls 218. Alternatively, each of the plurality of blockchains may expose the key repository through its ABI (Application Binary Interface). For the purpose of generating said private key and public key, an RSA encryption algorithm, an Elliptic Curve Digital Signature Algorithm (ECDSA), or other encryption algorithm known to those skilled in the art may be employed.

FIG. 4. depicts a detailed view of the list 206 comprising of one or more transactions added to the exemplary blockchain wherein each of the one or more transaction is mapped against a method name, an execution status for the transaction, and a returned hash from IPFS. An example entry of the list 206 reads as follows: 402 is a transaction added to the exemplary blockchain, requesting execution of a smart contract method 404 within a smart contract 406 deployed on a blockchain 410. The execution status of the transaction 402 is indicated by 408. The said execution status of the transaction 402 is determined from the validation indicator of the initial smart contract. The list 206 further stores a returned hash from IPFS 412 after the execution of the transaction 402 is complete. An entry reading False in the field 412 indicates that IPFS hash value is not retuned. Consequently, it can be identified that Txn0 requires smart contract method getpct ( ) and the execution status is pending, therefore no returned hash from IPFS. FIG. 4A depicts the list 206 in another state, where a hash address QmahmHDpSXGKUNxVGre3ZGj9wG9pGwhb691SZ dep4gV4XU returned by "Write to IPFS" standard method call is stored in field 412.

In yet another embodiment, each of the plurality of blockchains securely communicates with the distributed file system storage. Prior to writing an information on the distributed file storage system, each of the plurality of blockchains uses its private key to encrypt the information. This ensures the information is always stored in secure form on the distributed file storage system. The information, as per an embodiment of the present invention, is the method name for a smart contract method, the associated parameters of the smart contract method, a method output from an execution of the smart contract method etc. Similarly, in order to read the information from the distributed file system storage, each of the plurality of blockchains decrypts the information using the public key of the blockchain which encrypted the information, said public key being available in the key repository of each of the plurality of blockchains.

In operation, a host blockchain is selected by a user wherein the host blockchain is a blockchain on which the user is registered and on which an operation is initiated. It shall be appreciated by the person skilled in the art that the host blockchain is configured in a similar manner as the exemplary blockchain depicted in FIG. 2. Once the host blockchain is selected, the server arrangement appends a first transaction to the host blockchain wherein the first transaction comprises a method name and one or more parameters. The one or more parameters are required input parameters associated with a smart contract method corresponding to the method name. Further, the first transaction has pre-configured permissions to invoke one or more standard method calls from a initial smart contract of the host blockchain. The first transaction invokes, inter alia, "Write to IPFS" standard method calls in the initial smart contract of the host blockchain. The "Write to IPFS" standard method call writes the method name and the one or more parameters to a first storage location in IPFS. The IPFS returns a first hash address, the first hash address indicative of the first storage location. Subsequently, execution of the first transaction is deferred. An entry corresponding to the first transaction is added to the list maintained in the data structure repository of the initial smart contract of the host blockchain, wherein the entry includes the method name, deferred execution status of the first transaction and the first hash address. The deferred execution status is monitored through a validation indicator, implemented by means of a flag which is set in case of pending execution of a transaction.

The sever arrangement is further configured to receive the method name and the first address hash from the host blockchain. This is achieved by adding a query transaction to the host blockchain wherein the query transaction has pre-configured permissions to access the list maintained in the data structure repository of the initial smart contract of the host blockchain and read the first hash address stored in the entry corresponding to the first transaction. Preferably, the query transaction is added after a first pre-set delay wherein the first pre-set delay is based upon processing speed of the one-or more standard method calls of the host blockchain, and the distributed file storage system.

Figure 5:
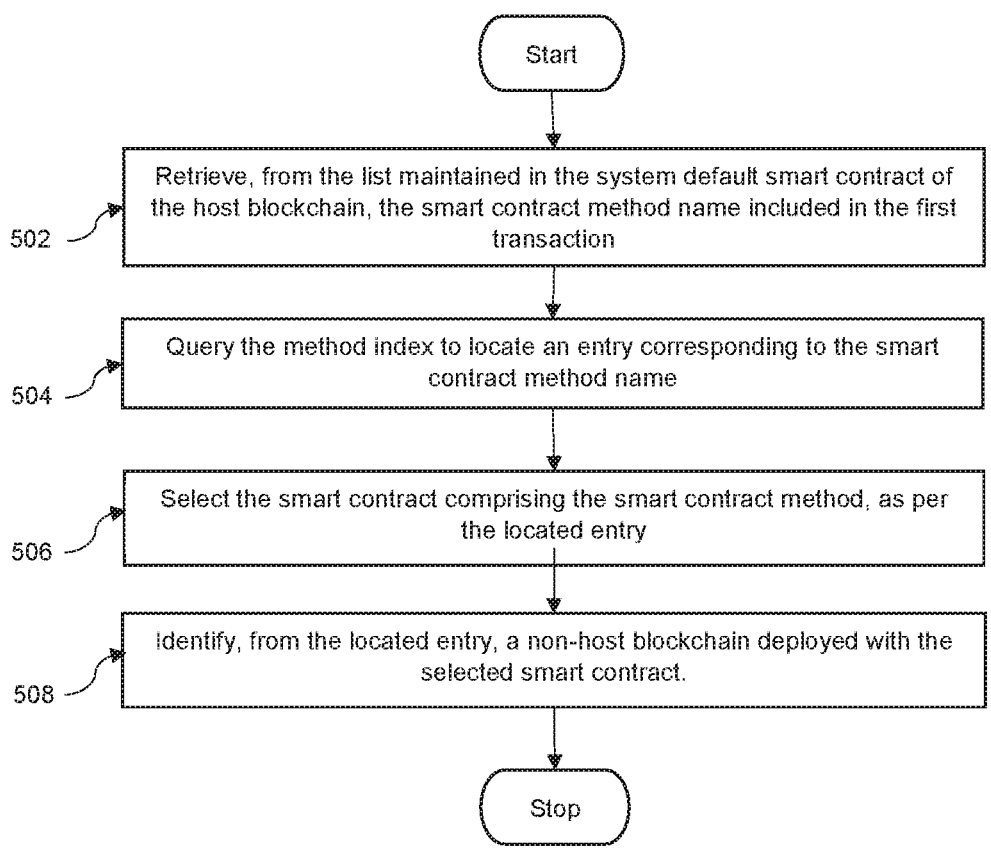
FIG. 5 depicts a flowchart outlining the steps involved in identifying a non-host blockchain in a preferred embodiment of the present invention.

The sever arrangement identifies a non-host blockchain which shall execute the smart contract method corresponding to the method name. The identification of the non-host blockchain is done by querying the method index based on the method name. FIG. 5 depicts a method 500 for identifying the non-host blockchain in a preferred embodiment of the present invention. At step 502, the server arrangement retrieves, from the list maintained in the data structure repository of the initial smart contract of the host blockchain, a method name included in the first transaction appended to the host blockchain. At 504, the server arrangement queries the method index to locate an entry corresponding to the method name. At 506, a smart contract listed against the located entry at 504 is selected. Finally, at 508, a non-host blockchain deployed with said smart contract comprising the smart contract method is identified, the non-host blockchain being the one listed against the selected smart contract, at 506, in the located entry of the method index. Once the non-host blockchain is identified, the non-host blockchain name is added against the entry corresponding to the first transaction in the list maintained in the data structure repository of the initial smart contract of the host blockchain. In another embodiment, the identification of the non-host blockchain can be done using a blockchain name provided by the user in the first transaction appended to the host blockchain.

Consequent to identification of the non-host blockchain, the server arrangement is operable to append a second transaction to the non-host blockchain wherein the second transaction comprises the first hash address and has pre-configured permissions to invoke one or more standard method calls from the initial smart contract of the non-host blockchain.

The second transaction appended to the non-host blockchain invokes "Read from IPFS" standard method call from the initial smart contract of the non-host blockchain by passing the first hash address. The "Read from IPFS" standard method call of the initial smart contract of the non-host blockchain reads the method name, and the one or more parameters available at the first hash address of IPFS. The method name, and the one or more parameters are returned by the "Read from IPFS" standard method call and the same is stored in the data structure repository of the initial smart contract of the non-host blockchain. A smart contract on the non-host blockchain comprising the smart contract method is identified. Subsequently, the smart contract method is executed, an method output is obtained and stored in the data structure repository of the initial smart contract of the non-host blockchain Further, the standard method call "Write to IPFS" is invoked from initial smart contract of the non-host blockchain wherein the "Write to IPFS" standard method call takes the method output stored in the stored in the data structure repository of the initial smart contract of the non-host blockchain as input parameter. The "Write to IPFS" standard method call writes the method output to a second storage location in IPFS and return a second hash address which is stored in the data structure repository of the initial smart contract of the non-host blockchain. The server arrangement is further configured to receive the second hash address after a second pre-set time, the second pre-set time based upon a processing time of the method and the non-host blockchain. It shall be appreciated that the second transaction is pre-configured to invoke the above-mentioned steps in sequential manner.

Subsequently, the server arrangement is operable to append a third transaction to the host blockchain wherein the third transaction comprises the second hash address and has pre-configured permissions to invoke one or more standard method calls from the initial smart contract of the host blockchain. The third transaction appended to the host blockchain invokes "Read from IPFS" standard method call from the initial smart contract of the host blockchain by passing the second hash address. The "Read from IPFS" standard method call of the initial smart contract of the host blockchain reads the method output available at the second hash address of IPFS and returns the method output, which is then stored in the data structure repository of the initial smart contract of the host blockchain as final output of the first transaction. Further, the validation indicator is reset indicating the execution status as complete for the first transaction. The final output is received by the sever arrangement by querying the entry record pertaining to the first transaction in the list maintained in the data structure repository of the initial smart contract of the host blockchain. It shall be understood that final output of the first transaction is same as the method output and the nomenclature used is different only for the purpose of highlighting a final output of the first transaction as appended to the host blockchain.

The following paragraphs disclose an example scenario implementing the claimed invention.

Figure 6:
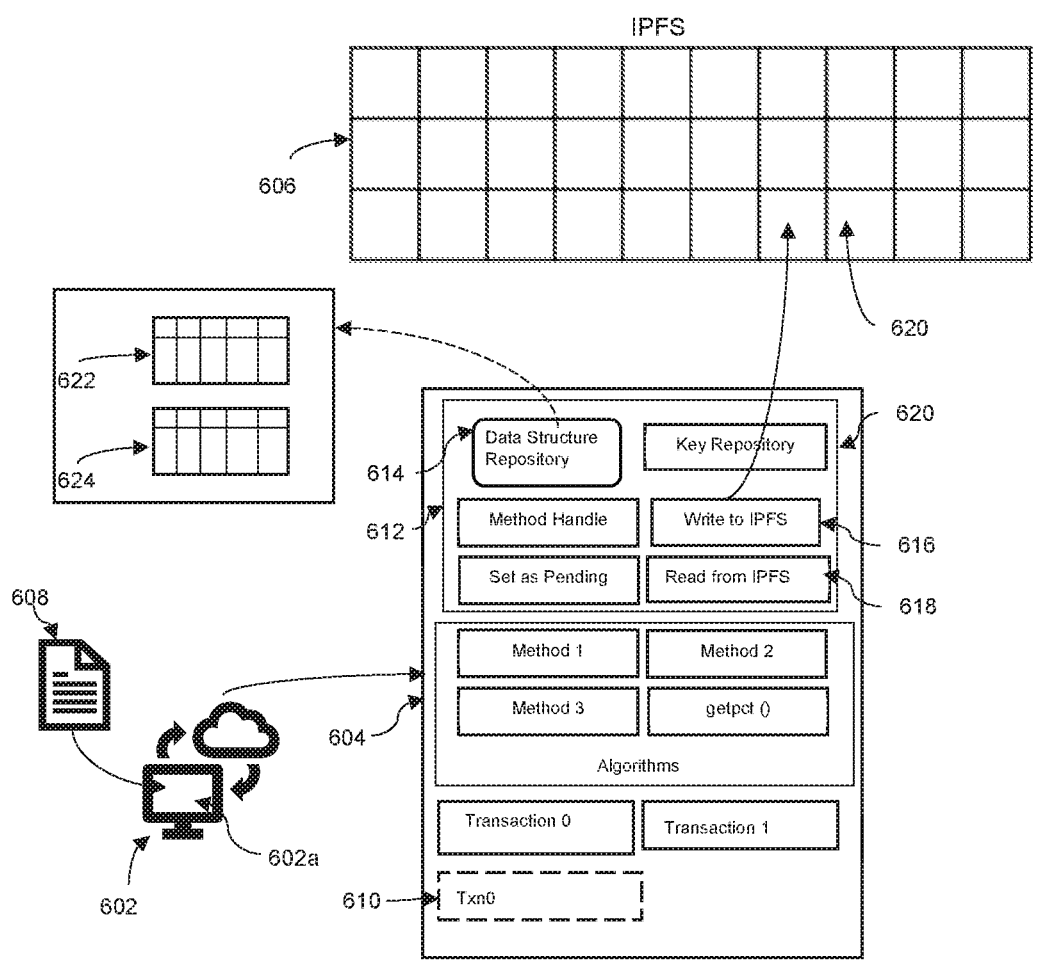
FIG. 6 depicts a blockchain, in operation, amongst the plurality of inter-connected blockchain communicably connected to a distributed file system storage.

FIG. 6 and FIG. 7 depict the example scenario in operation. Referring to FIG. 6, a user registered with one of the plurality of blockchains communicably coupled to the server arrangement 602, hereinafter designated as a host blockchain 604 for the purpose of this example, wishes to use a smart contract method which is not available on the host blockchain. For this example, the user wishes to use a smart contract method classify.documents( ) which classifies documents into patents and non-patent literature (NPL). The host blockchain 604 is communicably coupled to a distributed file storage system 606 which is IPFS for the purposes of this example. The smart contract method classify.documents( ) in this example takes four (4) parameters as input (param1, param2, param3, param4) based upon which a document is classified into patent/NPL. The user inputs, using a frontend unit 602a of the server arrangement, a document 608 for classification into patent/NPL and the smart contract method name i.e. classify.documents. The frontend unit 602a extracts the four(4) input parameters from the document 606 required for the smart contract method classify.documents ( )

The sever arrangement 602 appends a first transaction Txn0 610 to the host blockchain 604 wherein the Txn0 610 comprises the smart contract method name i.e. classify.documents and the four (4) parameters (False, False, US and False). Txn0 610 invokes "Write to IPFS" standard method call 616 in the initial smart contract 612 of the host blockchain 604. The "Write to IPFS" standard method call 616 writes classify.documents name and the four (4) parameters to a first storage location 620 in IPFS 606.

FIG. 7A depicts the contents of the first storage location 620 in the IPFS after execution of "Write to IPFS" standard method call.

Further, IPFS 606 returns a first hash address QmTfCejgo2wTwqnDJs8Lu1pCNeCrCDuE4GA wkna93zdd7d. Subsequently, execution of Txn0 610 is deferred. An entry corresponding to Txn0 610 is added to the list 622 maintained in the data structure repository 614 of the initial smart contract 612 of the host blockchain 604. Further, the initial smart contract 612 identifies, from the method index 624, a non-host blockchain B2 hosting a smart contract with classify.documents smart contract method. FIG. 7C depicts an entry in the method index 624.

FIG. 7B depicts the list 622 with the entry 702 added corresponding to transaction 610.

The sever arrangement 602 receives the smart contract method name classify.documents and the first address hash QmTfCejgo2wTwqnDJs8Lu1pCNeCrCDuE4GAwkna93 zdd7d by querying the entry 702 of the list 622 from the host blockchain 604.

Figure 8:
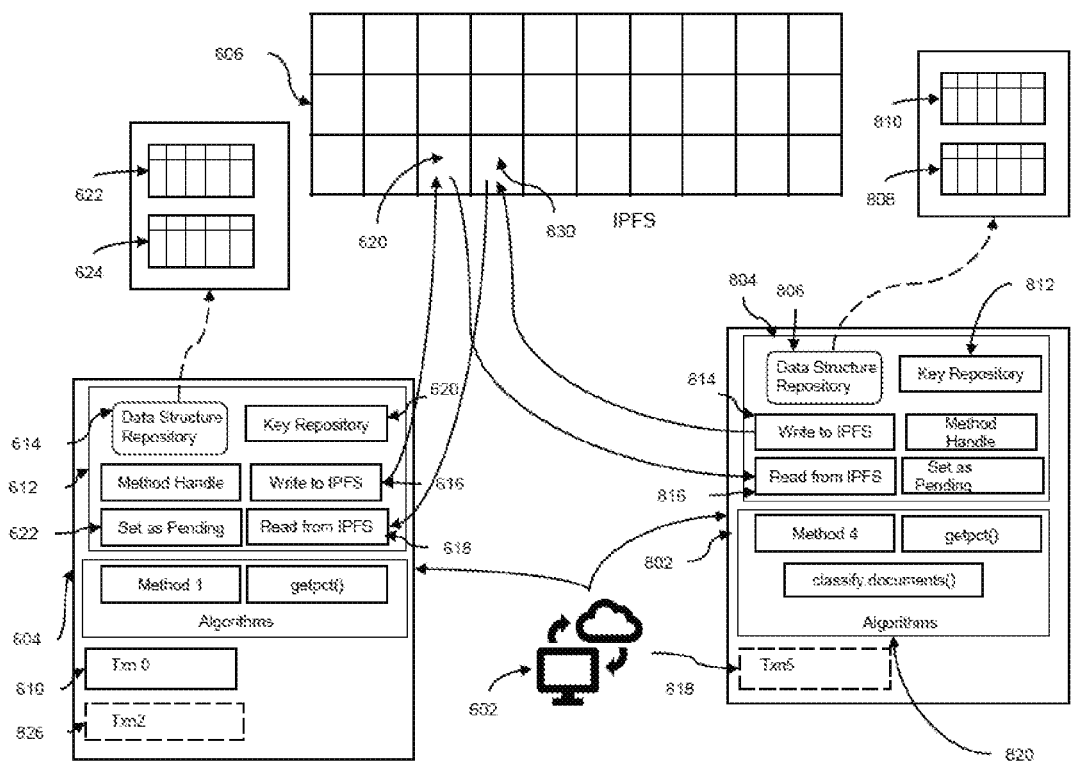
FIG. 8 depicts the host blockchain and the non-host blockchain in operation as per a preferred embodiment of the present disclosure.

Referring to FIG. 8, the server arrangement 602 appends a second transaction Txn5 818 to the non-host blockchain 802 wherein Txn5 818 comprises the first hash address QmTfCejgo2wTwqnDJs8Lu1pCNeCrCDuE4GAwkna93 zdd7d. Txn5 818 invokes "Read from IPFS" 816 from the initial smart contract 804 of the non-host blockchain 802 by passing the first hash address. "Read from IPFS" 816 reads data available at the first address hash and returns classify.documents (False, False, US and False). A smart contract @Classifier 820 on the non-host blockchain 802 comprising the smart contract method classify.documents( ) is identified. Subsequently, classify.documents( ) is executed, a method output Patent is obtained and stored in the data structure repository 806. Further, the standard method call "Write to IPFS" 814 is invoked from initial smart contract 804 of the non-host blockchain 802. The "Write to IPFS" 814 standard method call writes the method output Patent to a second storage location 830 in IPFS and returns a second hash address QmMfCejgo2wPwgnNJs8Lu1pCNeCrYDuE4GAw Ins31jed9a. The server arrangement 602 is further configured to receive the second hash address QmMfCejgo2wPwgnNJs8Lu1pCNeCrYDuE4GAw Ins31jed9a after a second pre-set time.

Subsequently, the server arrangement 602 appends a third transaction Txn2 826 to the host blockchain 604 wherein Txn2 826 comprises the second hash address QmMfCejgo2wPwgnNJs8Lu1pCNeCrYDuE4GAw Ins31jed9a.Txn 2 invokes "Read from IPFS" standard method call 618 from the initial smart contract 612 of the host blockchain 604 by passing the second hash address QmMfCejgo2wPwgnNJs8Lu1pCNeCrYDuE4GAw Ins31jed9a. "Read from IPFS" 618 reads the method output Patent available at 830 in IPFS then stores it the data structure repository 614 of the initial smart contract 612 of the host blockchain 604 as a final output of the first transaction Txn0 610. Further, the validation indicator 622 is reset to 0 indicating the execution status as complete for Txn0 610. The final output Patent is received by the sever arrangement 602 by querying the entry 702 of the list 622 from the host blockchain. The final output Patent is displayed on the frontend unit 602*a* of the sever arrangement 602. The input document 608 is hence classified as a patent. Thus, a user of a blockchain is enabled to use a smart contract method available on another blockchain but unavailable on the blockchain to which the user is registered without the need to rewrite the said smart contract method.

In an alternate embodiment of the present invention, the server arrangement appends a first transaction to a host blockchain wherein the first transaction comprises a method name and one or more parameters. The one or more parameters are the required input parameters for a smart contract method corresponding to the method name. Further, the first transaction has pre-configured permissions to invoke one or more standard method calls from a initial smart contract of the host blockchain. The first transaction invokes, inter alia, "Secure Write to IPFS" standard method call in the initial smart contract of the host blockchain by passing the method name and the one or more parameters as input parameters to the standard method call. The "Secure Write to IPFS" standard method call is configured to encrypt, using a private key of the host blockchain, the method name and the one or more parameters. The encrypted method name and the one or more parameters are then written on to IPFS. The IPFS returns a first hash address, indicating a first storage location for the method name, and the one or more parameters on the IPFS. Subsequently, execution of the first transaction is deferred. An entry corresponding to the first transaction is added to the list maintained in the data structure repository of the initial smart contract of the host blockchain, wherein the entry includes the smart contract method name, deferred execution status and the returned first hash address. The deferred execution status is monitored through a validation indicator, implemented by means of a flag which is set in case of pending execution of a transaction.

The sever arrangement is further configured to receive the method name and the first address hash from the host blockchain. This is achieved by adding a query transaction to the host blockchain wherein the query transaction has pre-configured permissions to access the list maintained in the data structure repository of the initial smart contract of the host blockchain and read the first hash address stored in the entry corresponding to the first transaction. Preferably, the query transaction is added after a first pre-set delay wherein the pre-set delay is based upon processing speed of the one-or more standard method calls of the host blockchain, and the distributed file storage system.

The sever arrangement identifies a non-host blockchain which shall execute the smart contract method corresponding to the method name. The non-host blockchain is identified in a similar fashion as depicted in FIG. 5. Consequent to identification of the non-host blockchain, the server arrangement is operable to append a second transaction to the non-host blockchain wherein the second transaction comprises the first hash address and a first blockchain name. The first blockchain name is an alias for the host blockchain.

The second transaction appended to the non-host blockchain invokes "Secure Read from IPFS" standard method call from the initial smart contract of the non-host blockchain by passing the first hash address and the first blockchain name. The "Secure Read from IPFS" standard method call of the initial smart contract of the non-host blockchain is configured to retrieve, from the key repository of the non-host blockchain, a public key corresponding to the first blockchain name i.e. the host blockchain. Further, the "Secure Read from IPFS" standard method call decrypts, using the retrieved public key of the host blockchain, and reads the method name, and the one or more parameters available at the first hash address of IPFS. The method name, and the one or more parameters are returned by the "Secure Read from IPFS" standard method call and the same is stored in the data structure repository of the initial smart contract of the non-host blockchain. A smart contract on the non-host blockchain comprising a smart contract method corresponding to the method name is identified. Subsequently, the smart contract method is executed, a method output is obtained and stored in the data structure repository of the initial smart contract of the non-host blockchain Subsequently, the standard method call "Secure Write to IPFS" is invoked from initial smart contract of the non-host blockchain wherein the "Secure Write to IPFS" standard method call takes the method output as input parameter. The "Secure Write to IPFS" standard method call is configured to encrypt, using a private key of the non-host blockchain, and write the method output to a second storage location in IPFS. The "Secure Write to IPFS" standard method call returns a second hash address which is stored in the data structure repository of the initial smart contract of the non-host blockchain. The server arrangement is further configured to receive the second hash address after a second pre-set time, the second pre-set time based upon a processing time of the smart contract method and the non-host blockchain.

Subsequently, the server arrangement is operable to append a third transaction to the host blockchain wherein the third transaction comprises the second hash address and a second blockchain name. The second blockchain name is an alias for the non-host blockchain. The third transaction appended to the host blockchain invokes "Secure Read from IPFS" standard method call from the initial smart contract of the host blockchain by passing the second hash address and the second blockchain name. The "Secure Read from IPFS" standard method call of the initial smart contract of the host blockchain is configured to retrieve, from the key repository of the host blockchain, a public key corresponding to the second blockchain name i.e. the non-host blockchain. Further, the "Secure Read from IPFS" standard method call decrypts, using the retrieved public key of the non-host blockchain, and reads the method output available at the second hash address of IPFS. The method output returned by the "Secure Read from IPFS" standard method call is stored in the data structure repository of the initial smart contract of the host blockchain as a final output of the first transaction. Further, the validation indicator is reset indicating the execution status as complete for the first transaction. The final output is received by the sever arrangement by querying the entry record pertaining to the first transaction in the list maintained in the data structure repository of the initial smart contract of the host blockchain.

Figure 9:
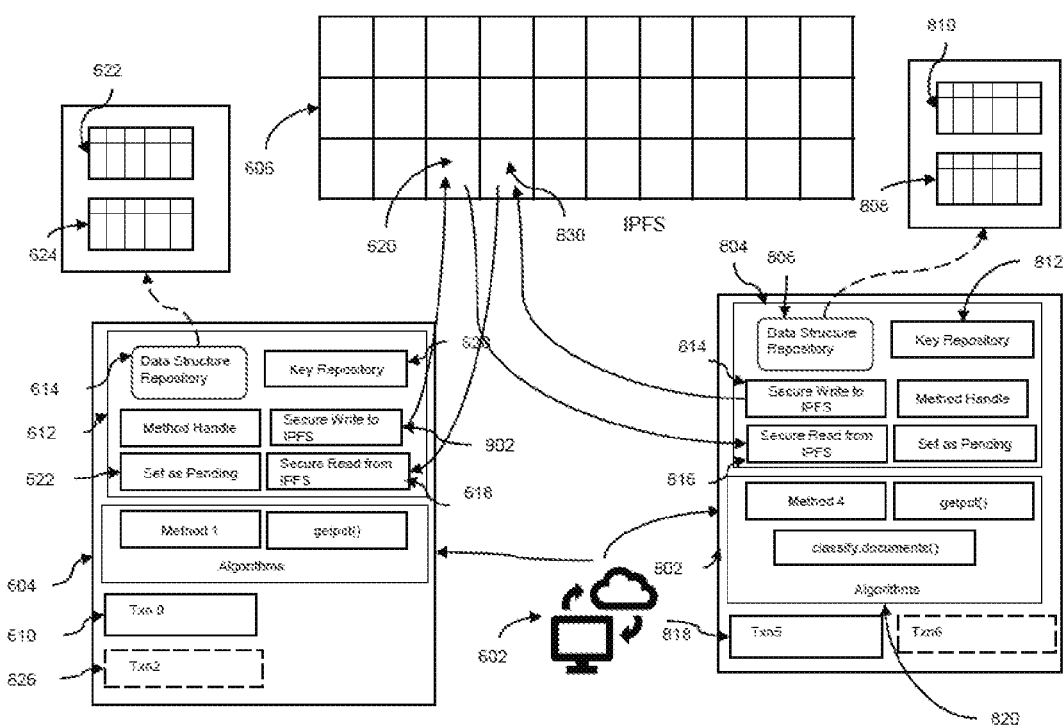
FIG. 9 depicts the host blockchain and the non-host blockchain in operation as per an alternate embodiment of the present disclosure.

Referring to FIG. 9 which depicts the example scenario, of document classification into patent/NPL described in the foregoing paragraphs, being implemented through the alternate embodiment of the system that allows secure communication between blockchains.

The sever arrangement 602 appends a first transaction Txn0 610 to the host blockchain 604 wherein the first transaction 610 comprises the smart contract method name i.e. classify.documents and the four (4) parameters (False, False, US and False). Txn0 610 invokes "Secure Write to IPFS" standard method call 902 in the initial smart contract 612 of the host blockchain 604. The "Secure Write to IPFS" standard method call 902 encrypts, using a private key of the host blockchain 604, the smart contract method name i.e. classify.documents and the four (4) parameters (False, False, US and False) and writes to a first storage location 620 in IPFS 606.

FIG. 10A depicts the contents of the first storage location 620 in the IPFS after execution of "Secure Write to IPFS" standard method call.

Further, IPFS 606 returns a first hash address QmIfJejgo2gTwqnMJs8Lu1pVNedrCDuE4G Awkna93zde9a. Subsequently, execution of Txn0 610 is deferred. An entry corresponding to the first Txn0 610 is added to the list 622 maintained in the data structure repository 614 of the initial smart contract 612 of the host blockchain 604. Further, the initial smart contract 612 identifies, from the method index 624, a non-host blockchain B2 hosting a smart contract @Classifier with classify.documents smart contract method. FIG. 10C depicts an entry in the method index 624.

FIG. 10B depicts the list 622 with the entry 1002 added corresponding to transaction 610.

The sever arrangement 602 receives the method name classify.documents and the first address hash QmIfJejgo2gTwqnMJs8Lu1pVNedrCDuE4GAwkna93 zde9a by querying the entry 1002 of the list 622 from the host blockchain 604.

Referring to FIG. 8, the server arrangement 602 appends a second transaction Txn5 818 to the non-host blockchain 802 wherein Txn5 818 comprises the first hash address QmIfJejgo2gTwqnMJs8Lu1pVNedrCDuE4GAwkna93 zde9a and a first blockchain name B1 for the host blockchain 604. Txn5 818 invokes "Secure Read from IPFS" 816 from the initial smart contract 804 of the non-host blockchain 802 by passing the first hash address.

The "Secure Read from IPFS" 816 is configured to retrieve, from the key repository 812 of the non-host blockchain 802, a public key MIGfMA0GCSqGSIb3DQEBAQUAA4GNADCBi QKBgQCqGKukO1De7zhZj6+H0qtjTv Ke4eCZ0FPqri0cb2JZfXJ/

DgYSF6vUpwmJG8wVQZKjeGcjDOL5Ulsuus FnczWBQ7R KNUSesmQRMSGkVb1/3j+skZ6UtW+ 5u09IHNsj6tQ51s1SPrCBkedbNf0Tp0GbMJD yR4e9T04ZZwIDAQAB corresponding to the first blockchain name B1 i.e. a public key of the host blockchain 604. "Secure Read from IPFS" 816 decrypts information available at the first address hash QmIfJejgo2gTwqnMJs8Lu1pVNedrCDuE4G Awkna93zde9a and returns classify.documents (False, False, US and False). A smart contract ©Classifier 820 on the non-host blockchain 802 comprising the smart contract method classify.documents( ) is identified. Subsequently, classify.documents( ) is executed, a method output Patent is obtained and stored in the data structure repository 806. Subsequently, the standard method call "Secure Write to IPFS" 814 is invoked from initial smart contract 804 of the non-host blockchain 802. The "Secure Write to IPFS" 814 standard method call is configured to encrypt, using a private key of the non-host blockchain 802, and write the method output Patent to a second storage location 830 in IPFS. The "Secure Write to IPFS" 814 standard method call returns a second hash address QyIfJefgl9gYwqxABs8Iv1lVDedrCOuW8GH wkna93zde2f. The server arrangement 602 is further configured to receive the second hash address QyIfJefgl9gYwqxABs8Iv1lVDedrCOuW8GHwkna93zde2f after a second pre-set time, the second pre-set time based upon a processing time of the smart contract method classify.documents( ) and the non-host blockchain 802.

Subsequently, the server arrangement 602 is operable to append a third transaction Txn2 826 to the host blockchain 604 wherein Txn2 826 comprises the second hash address QyIfJefgl9gYwqxABs8Iv1lVDedrCOuW8GHwkna93zde2f and a second blockchain name B2 for the non-host blockchain 802. Txn2 invokes "Secure Read from IPFS" standard method call 618 from the initial smart contract 612 of the host blockchain B1 by passing the second hash address and the second blockchain name B2 for the non-host blockchain. The "Secure Read from IPFS" 618 standard method call is configured to retrieve, from the key repository 620 of the host blockchain B1, a public key corresponding to second blockchain name B2 i.e. a public key of the non-host blockchain. Further, the "Secure Read from IPFS" 618 decrypts, using the retrieved public key of the non-host blockchain B2, and reads the method output Patent available at the second hash address QyIfJefgl9gYwqxABs8Iv1lVDedrCOuW8GH wkna93zde2f. The method output Patent returned by the "Secure Read from IPFS" 618 standard method call is stored in the data structure repository of the initial smart contract of the host blockchain as a final output of the first transaction. Further, the validation indicator is reset indicating the execution status as complete for the first transaction. The final output Patent is received by the sever arrangement 602 by querying the entry 702 of the list 622 from the host blockchain 604.

In another embodiment of the present invention, a method for executing a dynamic smart contract on a blockchain is provided. The term "dynamic smart contract" refers to a smart contract comprising one or more smart contract methods, the one or more smart contract methods being deployed across more than one blockchains of a plurality of blockchains communicably coupled to the server arrangement. The execution of the dynamic smart contract is provided by importing, in real-time, one or more smart contract methods available on a non-host blockchain, separate from the host blockchain, deployed with the dynamic smart contract.

In an example scenario of the embodiment described in the above-mentioned paragraph, in operation, the dynamic smart contract comprises three (3) smart contract methods, getpct( ), createsign( ), and classify.documents( ) respectively. Out of the said 3 smart contract methods, two (2) are present on the host blockchain i.e. the blockchain on which the dynamic smart contract is deployed. The smart contract method classify.documents( ) is not available on the host blockchain.

Figure 12:
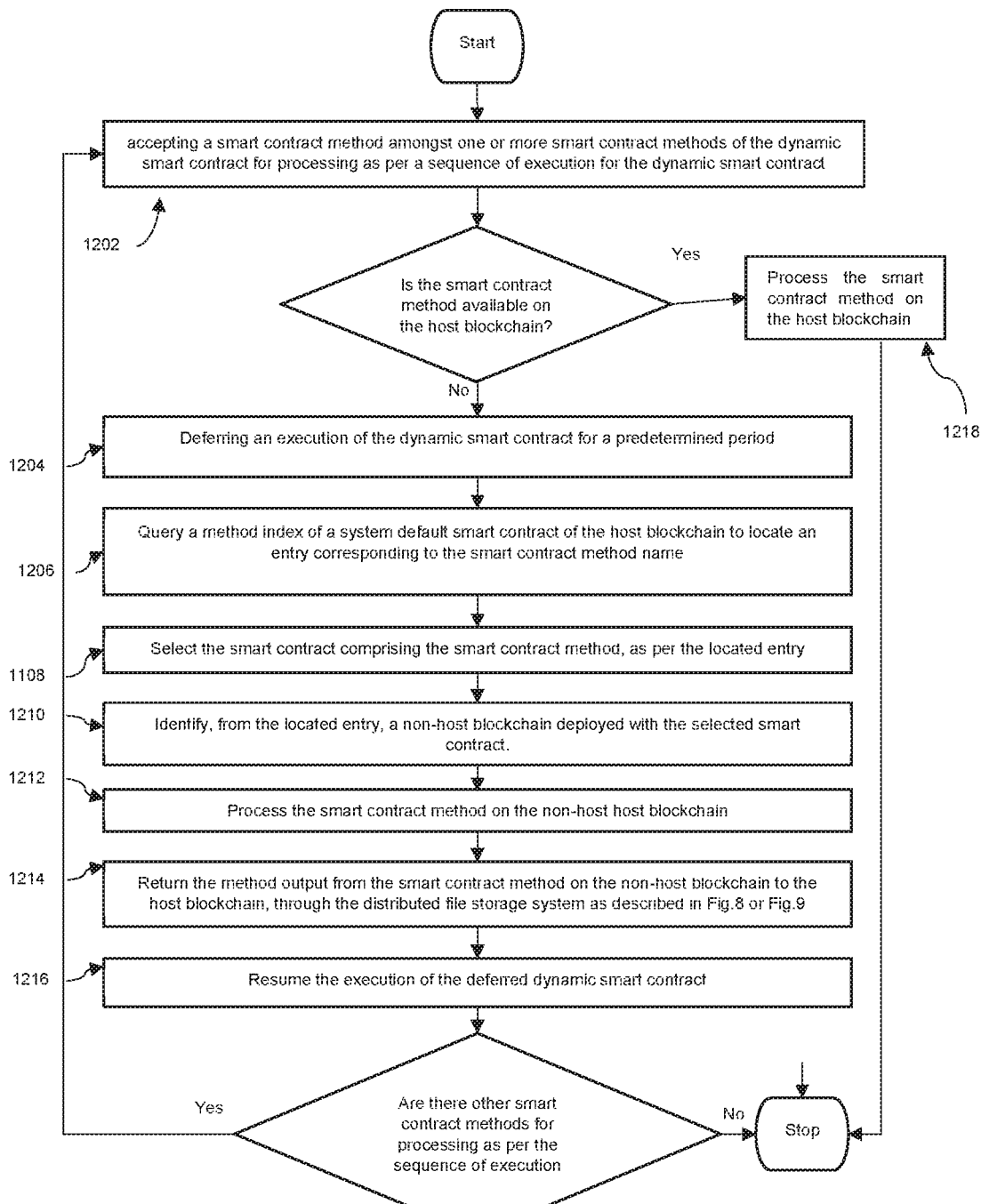
FIG. 12 is a detailed flowchart depicting execution of a dynamic smart contract

Referring to FIG. 12, during execution of the dynamic smart contract, at step 1202, a smart contract method classify.documents( ) is accepted for processing based on a sequence of execution. The sequence of execution primarily refers to an order in which the one or more smart contract methods are to be processed for the execution of the dynamic smart contract and forms the basis of an execution logic flow. The execution logic flow determines whether the smart contract method classify.documents( ) is available on the host blockchain. In case, the smart contract method is available on the host blockchain, the execution logic flow moves to 1218, wherein the smart contract method gets processed. In case of unavailability of said smart contract method on the host blockchain, the execution logic flow moves to step 1204 wherein an execution of the dynamic smart contract is deferred for a pre-determined time. At 1206, a method index of a initial smart contract of the host blockchain is queried to locate an entry corresponding to the smart contract method name. Further, at 1208, a smart contract comprising the smart contract method, as per the located entry is selected. Consequently, at 1210, a non-host blockchain deployed with the selected smart contract is identified. At 1212, the smart contract method is processed on the non-host blockchain. At 1214, a method output from the smart contract method on the non-host blockchain is returned to the host blockchain, through the distributed file storage system as described in FIG. 8 or FIG. 9. At 1216, the execution of the dynamic smart contract is resumed. The execution logic flow further determines if there are smart contract methods remaining for processing for completing the execution of the dynamic smart contract. If there are other smart contract methods that needs to be processed for the execution of the dynamic smart contract, the execution logic flow loops back to step 1202. Else, the dynamic smart contract is executed.

It shall be appreciated by the person skilled in the art that the foregoing description and embodiments depict interoperability between two blockchain and that the same can be extended to a plurality of blockchains communicably coupled to the server arrangement. It will be further appreciated that the terms "first", "second" and the like herein do not denote any specific role or order or importance, but rather are used to distinguish one party from another.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

The invention claimed is:

1. A system configured to enable interoperability amongst a plurality of blockchains communicably coupled to a distributed file storage system and a server arrangement, wherein the server arrangement comprises at least one processor and is configured to:
   initiate an execution of a smart contract on a host blockchain of the plurality of blockchains;
   append a first transaction to the host blockchain, the first transaction comprising a method name of a smart contract method not associated with the smart contract on the host blockchain and one or more input parameters associated with the smart contract method, wherein server arrangement is further configured to cause the host blockchain to:
   defer an execution of the first transaction for a predetermined time period;
   store the method name and the one or more input parameters on the distributed file storage system at a first storage location;
   receive a first hash address and the method name from the host blockchain wherein the first hash address identifies a first storage location for the method name, and the one or more input parameters on the distributed file storage system;
   identify a non-host blockchain of the plurality of blockchains that is configured to execute the smart method contract;
   append a second transaction to the non-host blockchain, the second transaction comprising the first hash address;
   receive a second hash address from the non-host blockchain wherein the second hash address identifies a second storage location on the distributed file storage system, the second storage location configured to store a method output from an execution of the smart contract method with the one or more input parameters by the non-host blockchain;
   append a third transaction to the host blockchain, the third transaction comprising the second hash address;
   receive, at the end of the predetermined time period, the method output; and
   indicate the execution of the first transaction, wherein the server arrangement is further configured to identify the non-host blockchain with the smart contract method based on a method index, the method index comprising a list of one or more method names mapped against at least one of the plurality of blockchains.

2. The system of claim 1 wherein both the host blockchain and the non-host blockchain comprise an initial smart contract, the initial smart contract further comprising one or more standard method calls for a communication with the distributed file storage system.

3. The system of claim 2 wherein the initial smart contract further comprises a data structure repository configured to maintain a list of one or more transactions along with an execution status of the one or more transactions, the first transaction being included in the one or more transactions.

4. The system of claim 1 wherein both the host blockchain and the non-host blockchain is configured to encrypt communications with the distributed file storage system.

5. The system of claim 4 wherein the host blockchain and the non-host blockchain are respectively assigned a private key and a public key.

6. The system of claim 1 wherein the predetermined time period is based on an execution time of the smart contract method on the non-host blockchain.

7. A system for interoperability of a plurality of blockchains communicably coupled to a distributed file storage system and a server arrangement, the system comprising a processor, wherein the processor is configured to:
  receive a first transaction from a host blockchain for execution of a smart contract method not associated with the host blockchain, the transaction comprising a method name corresponding to the smart contract method and one or more input parameters;
  encrypt and transmit to the distributed file storage system, the method name and the one or more input parameters;
  defer execution of the first transaction for a predetermined time period;
  identify a non-host blockchain from the plurality of blockchains, the non-host blockchain configured with the smart contract method associated with the method name;
  receive a second hash address;
  decrypt and read from the distributed file storage system, a method output from an execution of the smart contract method associated with the method name on the non-host blockchain with the one or more input parameters;
  receive and store on the host blockchain the method output pertaining to the execution of the smart contract method by with the one or more input parameters by the non-host block chain; and
  execute the first transaction at the end of the predetermined time period and indicate the execution of the first transaction, wherein
  the server arrangement is further configured to identify the non-host blockchain with the smart contract method based on a method index, the method index comprising a list of one or more method names mapped against at least one of the plurality of blockchains.

8. The system of claim 7, wherein the second hash address identifies a second storage location on the distributed file storage system, the second storage location configured to store the method output from the execution of the smart contract method with the one or more input parameters on the non-host blockchain.

9. A method for executing a dynamic smart contract on a host blockchain, wherein the dynamic smart contract comprises one or more smart contract methods to be processed in a sequence of execution, the one or more smart contract methods deployed across a plurality of blockchains, separate from the host blockchain, the method comprising the steps of:
  a) accepting a smart contract method from the one or more smart contract methods;
  b) determining an availability of the smart contract method on the host blockchain;
  c) deferring an execution of the dynamic smart contract on the host blockchain for a predetermined time period when the smart contract method is not available on the host blockchain;
  d) identifying a non-host blockchain deployed with the first smart contract method from the plurality of blockchains, wherein identifying the non-host blockchain comprises identifying the non-host blockchain from on a method index, the method index comprising a list of one or more method names mapped against at least one of the plurality of blockchains;
  e) receiving a method output resulting from an execution of the smart contract method executed on the non-host blockchain;
  f) resuming the execution of the dynamic smart contract method at the end of the predetermined time period;
looping to step (a) until a last smart contract method of the one or more smart contract methods of the dynamic smart contract is processed as per the sequence of execution.

* * * * *